United States Patent
Fallows et al.

(10) Patent No.: US 9,331,890 B1
(45) Date of Patent: May 3, 2016

(54) EXTENDING WEBSOCKET PROTOCOL

(71) Applicant: Kaazing Corporation, Mountain View, CA (US)

(72) Inventors: John R. Fallows, Palo Alto, CA (US); Steven R. Atkinson, Morgan Hill, CA (US)

(73) Assignee: Kaazing Corporation, San Jose, CA (US)

( * ) Notice: Subject to any disclaimer, the term of this patent is extended or adjusted under 35 U.S.C. 154(b) by 693 days.

(21) Appl. No.: 13/670,366

(22) Filed: Nov. 6, 2012

Related U.S. Application Data

(60) Provisional application No. 61/710,618, filed on Oct. 5, 2012.

(51) Int. Cl.
*G06F 15/16* (2006.01)
*H04L 29/06* (2006.01)
*H04L 12/24* (2006.01)

(52) U.S. Cl.
CPC ............ *H04L 29/0653* (2013.01); *H04L 12/24* (2013.01)

(58) Field of Classification Search
USPC .......................................................... 709/236
See application file for complete search history.

(56) References Cited

U.S. PATENT DOCUMENTS

| | | | |
|---|---|---|---|
| 6,711,136 | B1 | 3/2004 | Schneider et al. |
| 9,154,485 | B1 * | 10/2015 | Fallows ................. H04L 63/08 |
| 2008/0127323 | A1 | 5/2008 | Soin et al. |
| 2011/0010543 | A1 | 1/2011 | Schmidt et al. |
| 2012/0207088 | A1 | 8/2012 | Liu et al. |
| 2013/0067102 | A1 | 3/2013 | Paller et al. |
| 2013/0152175 | A1 | 6/2013 | Hromoko et al. |
| 2013/0232223 | A1 * | 9/2013 | Ma ...................... H04L 67/2814 |
| | | | 709/217 |
| 2014/0026187 | A1 | 1/2014 | Johnson et al. |
| 2014/0056313 | A1 | 2/2014 | Wada |
| 2015/0046599 | A1 | 2/2015 | Ulanov et al. |

OTHER PUBLICATIONS

Fette, I., & Melnikov, A. (Dec. 2011). "The WebSocket protocol".*

\* cited by examiner

*Primary Examiner* — Kevin Bates
*Assistant Examiner* — Emad Siddiqi
(74) *Attorney, Agent, or Firm* — Van Pelt, Yi & James LLP

(57) ABSTRACT

Receiving a WebSocket frame is disclosed. The WebSocket frame is received. It is determined whether the WebSocket frame includes a control byte sequence in a payload data portion of the WebSocket frame. In the event the WebSocket frame includes in the payload data portion, the control byte sequence and other data, the WebSocket frame interpreted as including a control message. In the event the WebSocket frame does not include in the payload data portion, the control byte sequence, the WebSocket frame interpreted as not including the control message.

25 Claims, 8 Drawing Sheets

EXTENDING WEBSOCKET PROTOCOL

CROSS REFERENCE TO OTHER APPLICATIONS

This application claims priority to U.S. Provisional Patent Application No. 61/710,618 entitled WEBSOCKET CONTROL EXTENSIONS filed Oct. 5, 2012 which is incorporated herein by reference for all purposes.

BACKGROUND OF THE INVENTION

The WebSocket protocol enables traditional half-duplex Hypertext Transfer Protocol (HTTP) or HTTP over SSL (HTTPS) communication to be upgraded to a bi-directional, full-duplex communication channel over a Transmission Control Protocol (TCP) connection. The WebSocket protocol has been standardized by the Internet Engineering Task Force (IETF) standards organization as RFC 6455. The WebSocket protocol, as standardized, was intended to be a generalized protocol and may lack extended functionality that may be desired by a user. One example of desired extended functionality arises in situations where an application utilizing the WebSocket protocol lacks resources to efficiently process all of the received data in a timely manner. If data is being received at a rate that is faster than the optimal rate, an application utilizing the WebSocket protocol may become overwhelmed. Although the WebSocket protocol was intended to be extensible, the standardized version lacks specific guidance on how to best extend the protocol. Therefore, there exists a need for an efficient way to extend the WebSocket protocol.

BRIEF DESCRIPTION OF THE DRAWINGS

Various embodiments of the invention are disclosed in the following detailed description and the accompanying drawings.

DETAILED DESCRIPTION

Figure 1:
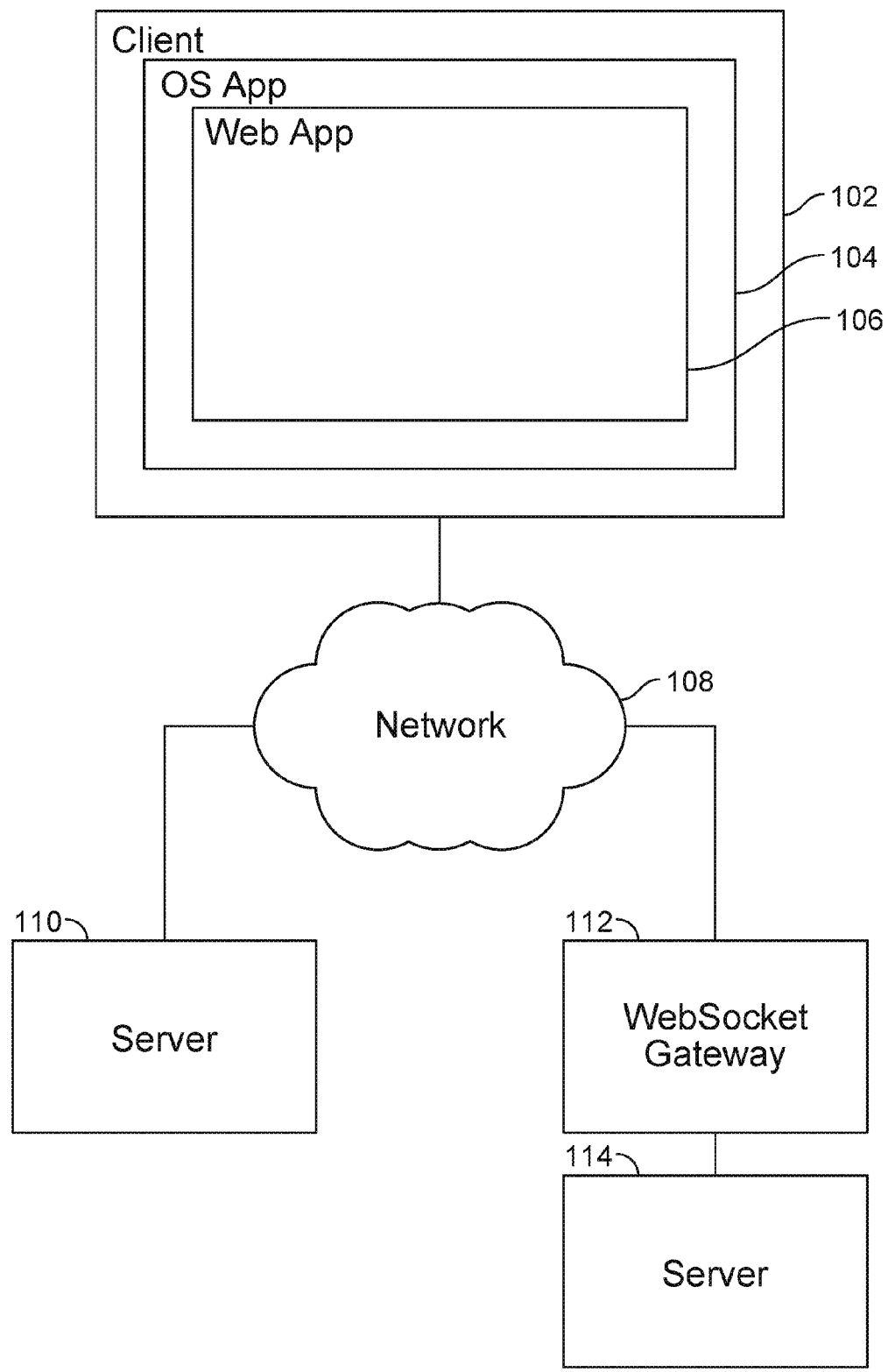
FIG. 1 is a diagram illustrating an example WebSocket communication environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

The WebSocket protocol has been standardized by the Internet Engineering Task Force (IETF) standards organization as RFC 6455 (available at http://tools.ietf.org/html/rfc6455). RFC 6455 includes details on the initialization handshake and data framing of the WebSocket protocol. As specified in RFC 6455, once a WebSocket connection has been established using the handshake process between at least two communicating nodes, WebSocket communication is performed by transmitting WebSocket frames. A high-level overview of bits contained in a WebSocket frame is given in the following table reproduced from RFC 6455.

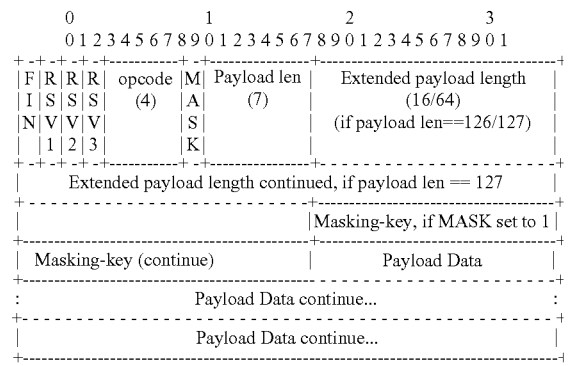

As shown above, the beginning portions of a WebSocket frame include metadata information regarding configuration of data contained in the WebSocket frame. Additional details on the groups of bits in the WebSocket frame may be found in RFC 6455. The ending section of the WebSocket frame includes the actual payload data (e.g., application level data). The location of the payload data within the WebSocket frame may vary depending on the size of the payload data and whether a masking key is utilized. WebSocket frames are base units of communication data framing in WebSocket communication. By default, the WebSocket Protocol may use port 80 for regular WebSocket connections and port 443 for WebSocket connections tunneled over Transport Layer Security (TLS).

Sending a WebSocket frame that includes a control message is disclosed. After a WebSocket connection is established between communication parties, communication between them is achieved using WebSocket frames. Each frame includes a metadata portion and a payload data portion. The metadata portion may include data specifying predetermined configuration/functionality as specified in the adopted standard of the WebSocket protocol. Because the metadata portion is of a predetermined size and most of the bits of the metadata portion are already committed to existing functionality, it is not efficient to utilize the metadata portion to extend the functionality of the WebSocket protocol. The payload data portion of the WebSocket frame traditionally contains application level data that is intended to be passed to an end destination application. In some embodiments, the payload data portion of a WebSocket frame is utilized to include a control message that is processed in a different manner as compared to a normal WebSocket frame that does not include the control message. For example, a WebSocket frame that includes a control message specifies an instruction on how to process and/or communicate subsequent normal WebSocket frames. A WebSocket frame may be identified as including a control message by placing a control byte sequence within the payload data portion of the WebSocket frame. When normal payload data (e.g., end destination application level data) without a control message is sent in a WebSocket frame, the control byte sequence is not included in the payload data portion of the frame. By not dedicating a fixed amount of bits in the WebSocket frame for the control byte sequence, the bandwidth overhead required to implement the control message is reduced.

In some cases, an application utilizing the WebSocket protocol lacks resources to efficiently process all of the received data in a timely manner. If data is being received at a rate that is faster than the optimal rate, an application utilizing the WebSocket protocol may become overwhelmed. This may have an effect on battery life and performance of a device utilizing the WebSocket protocol. For example, a processor of a device may be executed in distinct power states corresponding to the amount of computing resource required. Because transiting between power states consumes processing and power resources, once a processor is in a high power state, it may linger in the high power state for a period of time before powering down to a lower power state. Bursts of large amounts of data at a high communication rate may keep the device at a high power state even though a constant lower transmission rate could allow the device to process the same amount of data in the same amount time without causing the device to enter the high power state. In some cases, when an application is unable to timely process received WebSocket communication, it may be desirable to reduce the rate at which data is being received by reducing the fidelity of the data being sent. In other cases it may be desirable to resume/ increase the rate at which data is being sent. Therefore, it is desirable to be able to control the communication rate of a WebSocket communication. In some embodiments, when it is detected that a rate at which WebSocket communication is being received is not optimal, a desired WebSocket communication receive rate is determined by a receiver of the communication. This communication rate is notified to a sender of the WebSocket communication to enable the sender to adjust the transmission rate of the WebSocket communication.

FIG. 1 is a diagram illustrating an example WebSocket communication environment. Client 102 is connected to server 110 and WebSocket gateway 112 via network 108. Server 114 may be accessed by client 102 via WebSocket gateway 112. Examples of client 102 include a computer, a tablet device, a smartphone, and any computing device. Client 102 may be used by a user to access services and/or content at least in part provided by server 110 and/or server 114. For example, server 110 hosts web content that is obtained by client 102. Any type of data and service may be provided by server 110 and server 114. In some embodiments, an HTTP/HTTPS connection between client 102 and server 110 is requested by client 102 to be upgraded to a WebSocket connection. Server 110 may handle the request and communicate with client 102 using the WebSocket protocol. In some embodiments, a WebSocket upgrade request received by server 110 is forwarded to WebSocket gateway 112 for handling. WebSocket gateway 112 may handle WebSocket upgrade requests, a WebSocket initialization handshake, and handling of WebSocket communication for server 110. In some embodiments, once a WebSocket upgrade request received by server 110 is forwarded to WebSocket gateway 112 for handling, data/services provided using the WebSocket protocol may be provided to server 112.

In some embodiments, an HTTP or HTTPS connection between client 102 and server 114/WebSocket gateway 112 is requested by client 102 to be upgraded to a WebSocket connection. WebSocket gateway 112 enables content and/or services provided by server 114 to be accessed via a WebSocket protocol. For example, WebSocket gateway 112 handles WebSocket upgrade requests, a WebSocket initialization handshake, and handling of WebSocket frames for server 114. WebSocket gateway 112 may proxy communication between client 102 and server 114, at least in part by allowing WebSocket gateway 112 to encode communication sent by server 114 into WebSocket frames to be sent to client 102 and decoding received by WebSocket frames from client 102 into a data format desired by server 114. By utilizing WebSocket gateway 112, server 114 can take advantage of the WebSocket protocol without the need to directly implement the entire WebSocket protocol.

Client 102 includes operating system level application (OS App) 104. OS App 104 is hosting web application 106. For example, OS App 104 is a web browser and web application 106 is a Javascript application executed using the web browser. In another example, OS App 104 is a mobile device application and web application 106 is a component of the mobile device application. Other examples of OS App 104 include any application executing on an operating system hosted by client 102. In some embodiments, protocol level processing of WebSocket communication is handled by OS App 104 for web application 106. For example, when a WebSocket connection is requested by web application 106, OS App 104 handles the handshake, protocol control, protocol configuration, and WebSocket frame and message processing to allow only the web application level data contained in a payload portion of a WebSocket frame to be sent to web application 106. In some embodiments, web application 106 may process select sets of WebSocket control configurations.

Examples of network 108 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. One or more of the components shown in FIG. 1 may be included in the same machine. Other communication paths may exist and the example of FIG. 1 has been simplified to illustrate the example clearly. Although single instances of components have been shown to simplify the diagram, additional instances of any of the components shown in FIG. 1 may exist. For example, multiple clients may be communicating with multiple servers that may be utilizing multiple WebSocket gateways. Additional OS applications and web applications may be hosted by client 102. Components not shown in FIG. 1 may also exist.

Figure 2:
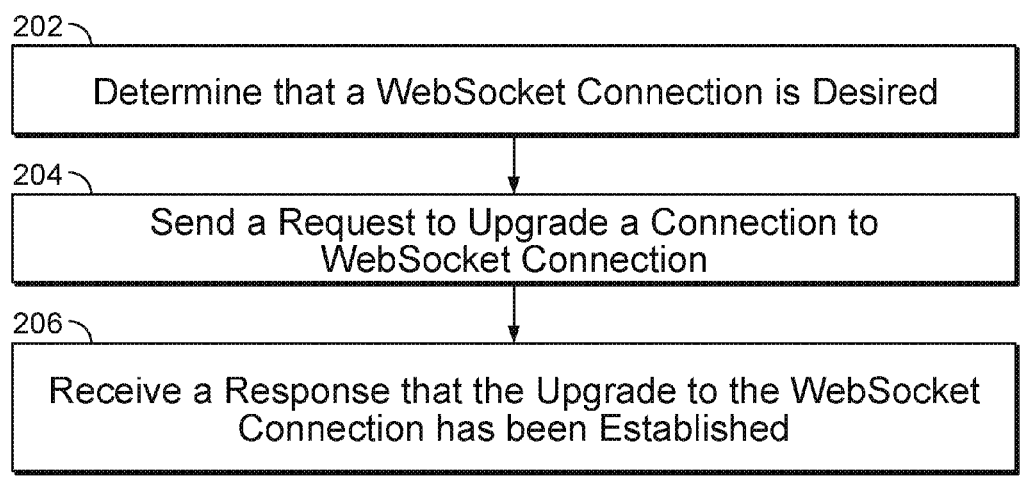
FIG. 2 is a flowchart illustrating an embodiment of a process for requesting a WebSocket connection.

FIG. 2 is a flowchart illustrating an embodiment of a process for requesting a WebSocket connection. The process of FIG. 2 may be implemented on one or more components of client 102 of FIG. 1. At 202, it is determined that a WebSocket connection is desired. In some embodiments, determining that the WebSocket connection is desired includes receiving a request (e.g., from an application such as web application 106 of FIG. 1) that a WebSocket connection is desired. In some embodiments, determining that the WebSocket connection is desired includes detecting that a WebSocket connection is desired. In some embodiments, determining that the WebSocket connection is desired is associated with visiting a website, launching an application, and/or a request to obtain content available via a WebSocket connection. The determination that a WebSocket connection is desired may be associated with an existing HTTP/HTTPS connection that is to be upgraded to a WebSocket connection. In some embodiments, the determination that a WebSocket connection is desired is made by an operating system level application such as OS application 104 of FIG. 1. For example, a web application running on a web browser signals to the web browser that an HTTP/HTTPS connection is to be upgraded to a WebSocket connection. In another example, when an application such as a mobile application is launched, an HTTP/HTTPS connection to a server is initialized and it is determined that the HTTP/HTTPS connection is to be upgraded to a WebSocket connection.

At 204, a request to upgrade a connection to a WebSocket connection is sent. The request may be sent to a server of the connection such as server 110, server 114 and/or WebSocket gateway 112 of FIG. 1. In some embodiments, sending the request includes initializing a WebSocket handshake to upgrade the connection. The connection may be an already established HTTP/HTTPS connection and/or a new HTTP/HTTPS connection established in response to the determination made at 202. For example, the opening handshake is intended to be compatible with HTTP/HTTPS-based server-side software and intermediaries, so that a single port can be used by both HTTP/HTTPS clients talking to that server and WebSocket clients talking to that server. In some embodiments, the request to update the connection is managed by an operating system level application such as OS application 104 of FIG. 1. In some embodiments, sending the request includes initializing an opening handshake as specified in the WebSocket standard. In some embodiments, the request includes identification of one or more capabilities of a client that is not directly specified in the WebSocket protocol standard. For example, the request includes one or more identifiers of one or more extended capabilities of the WebSocket protocol that are supported by a client sending the request. In some embodiments, the request includes a request to initialize support for an extended capability that is able to be controlled using a control message. For example, the request includes a request to utilize a control message regarding a specified extended capability not directly implemented by the WebSocket protocol standard. In some embodiments, the request to initialize the control message includes one or more configurations associated with utilizing the control message.

At 206, a response that the upgrade to the WebSocket connection has been established is received. The response may be sent to a client by a server such as server 110, server 114 and/or WebSocket gateway 112 of FIG. 1. In some embodiments, receiving the response includes receiving a response to a WebSocket handshake upgrade request sent in 204. In some embodiments, the request to update the connection is received by an operating system level application such as OS application 104 of FIG. 1 and the operating system level application informs a hosted application such as web application 106 that the WebSocket connection has been established. In some embodiments, receiving the response includes completing an opening handshake as defined in the WebSocket standard. In some embodiments, the response includes a confirmation of support for one or more protocol capabilities that are not directly specified in the WebSocket protocol standard. For example, the response includes identifiers of one or more extended capabilities of the WebSocket protocol that are supported by a server. Not all extended capabilities requested by a client in a request may be supported. In some embodiments, the response includes a response to a request to initialize an extended capability that can be controlled using a control message. For example, the response includes confirmation that a control message for a specified extended capability not directly implemented by the WebSocket protocol standard may be utilized. In some embodiments, the response includes one or more configuration parameters associated with the control message. For example, the response includes a control byte sequence to be utilized to identify that a sent communication includes a control message associated with a specific extended capability identified by the control byte sequence.

Figure 3:
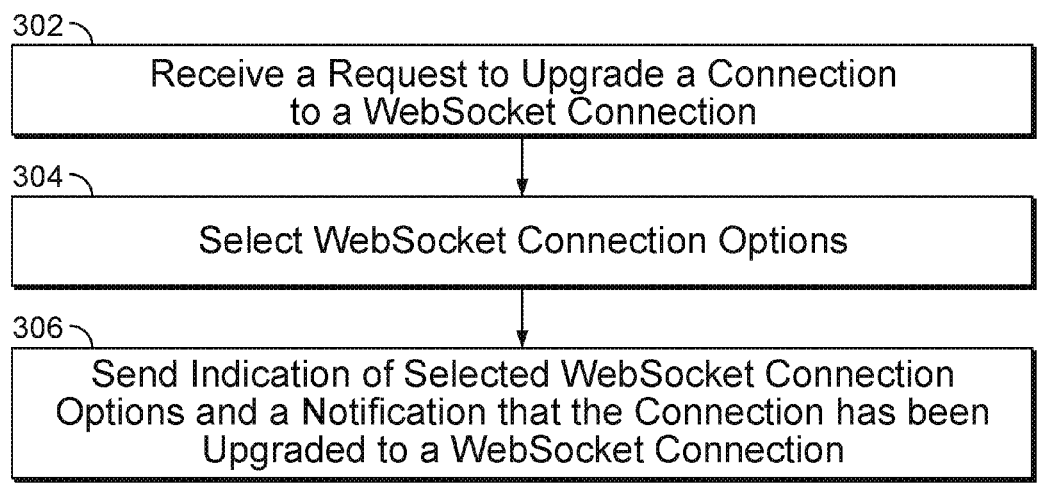
FIG. 3 is a flowchart illustrating an embodiment of a process for confirming a request to establish a WebSocket connection.

FIG. 3 is a flowchart illustrating an embodiment of a process for confirming a request to establish a WebSocket connection. The process of FIG. 3 may be implemented on one or more components of server 110, server 114 and/or WebSocket gateway 112. At 302, a request to upgrade a connection to a WebSocket connection is received. In some embodiments, the request is associated with visiting a website, launching an application, and/or a request to obtain content available via a WebSocket connection. In some embodiments, the request was made by an operating system level application such as OS application 104 of FIG. 1. For example, a web browser has made the request in response to a web application running on the web browser that has requested the WebSocket connection. In another example, when an application such as a mobile application is launched, an HTTP/HTTPS connection to a server for the mobile application is initialized and a request to upgrade the HTTP/HTTPS connection is sent to the server. In some embodiments, the request received at 302 includes the request sent at 204 of FIG. 2.

In some embodiments, the request is associated with initializing a WebSocket handshake to upgrade the connection. The connection may be an already established HTTP/HTTPS connection and/or a new HTTP/HTTPS connection established in response to the determination made at 202. For example, the opening handshake is intended to be compatible with HTTP/HTTPS-based server-side software and intermediaries, so that a single port can be used by both HTTP/HTTPS clients talking to that server and WebSocket clients talking to that server. In some embodiments, the received request initializes an opening handshake as described in the WebSocket standard. In some embodiments, the request includes identification of one or more capabilities of a client that are not directly implemented in the WebSocket protocol standard. For example, the request includes one or more identifiers of one or more extended capabilities of the WebSocket protocol that are supported by a client sending the request. In some embodiments, the request includes a request to initialize support for an extended capability that is able to be controlled using a control message. For example, the request includes a request that utilizes a control message regarding a specified extended capability not directly implemented by the WebSocket protocol standard. In some embodiments, the request to initialize the control message includes one or more configurations associated with utilizing the control message. In some embodiments, the configuration of the control message includes a configuration specifying which one or more communication party is allowed to utilize the control message. For example, only a client side communication party, not a server-side communication party, of a WebSocket connection is configured to utilize a control message that enables specification of a desired communication rate. In some embodiments, different control messages may be associated with different configurations of allowed communication parties that are allowed to utilize the control message.

At 304, WebSocket connection options are selected. In some embodiments, selecting the WebSocket connection options include configuring the WebSocket connection and/or options associated with the WebSocket connection. In some embodiments, selecting the WebSocket connection options include determining which one or more of the provided configuration options provided in the request received at 302 should be supported. For example, the received request includes a plurality of possible configuration options and only one of the options is to be selected by the receiver of the request. In some cases, the receiver may be able to select a plurality of options from the plurality of configuration options. In some embodiments, selecting the WebSocket connection option includes determining whether a configuration option in a received request is supported by the receiver of the request. For example, the request received at 302 includes an identifier of an extended capability of the WebSocket protocol and it is determined whether the receiver of the request supports the extended capability. In some embodiments, selecting the WebSocket connection option includes configuring a control message. For example, a control byte sequence to be utilized to signal a control message associated with a specified extended capability is determined.

At 306, a response indicating the selected WebSocket connection options and a notification that the connection has been upgraded to a WebSocket connection are sent. The response may be sent to a client by a server such as server 110, server 114 and/or WebSocket gateway 112 of FIG. 1. In some embodiments, sending the response includes sending a response to a WebSocket handshake upgrade request received in 302. In some embodiments, sending the response includes completing an opening handshake as defined in the WebSocket standard.

In some embodiments, the response includes a confirmation of support for one or more protocol capabilities that are not directly specified in the WebSocket protocol standard. For example, the response includes identifiers of one or more extended capabilities of the WebSocket protocol that are supported by a server. Not all extended capabilities requested by a client in a request may be supported. In some embodiments, the response includes a response to a request to initialize an extended capability that can be controlled using a control message. For example, the response includes confirmation that a control message for a specified extended capability not directly implemented by the WebSocket protocol standard may be utilized. In some embodiments, the response includes one or more configuration parameters associated with the control message. For example, the response includes a control byte sequence to be utilized to identify that a sent communication includes a control message associated with a specific extended capability identified by the control byte sequence.

Figure 4:
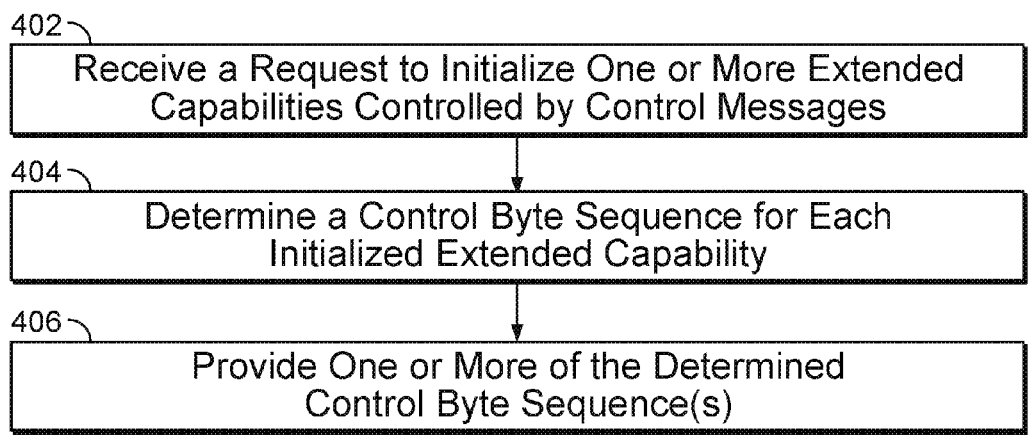
FIG. 4 is a flowchart illustrating an embodiment of a process for providing a control byte sequence.

FIG. 4 is a flowchart illustrating an embodiment of a process for providing a control byte sequence. The process of FIG. 4 may be implemented on one or more components of server 110, server 114 and/or WebSocket gateway 112. In some embodiments, at least a portion of the process of FIG. 4 is included in step 302 and/or 304 of FIG. 3. At 402, a request to initialize one or more extended capabilities controlled by control messages is received. In some embodiments, the request to initialize the extended capabilities was included in the request sent in 204 of FIG. 2. In some embodiments, the request to initialize the controlled extended capabilities was included in the request received in 302 of FIG. 3. In some embodiments, the request to initialize the controlled extended capabilities is received as a request outside of the WebSocket upgrade handshake process. For example, the request is received after a WebSocket connection has been already established. In some embodiments, the request includes an identification of one or more capabilities that are not directly specified in the WebSocket protocol standard. For example, the request includes an identifier of an extended capability of the WebSocket protocol that is supported by a client sending the request. In some embodiments, the request includes a request to initialize the utilization of one or more control messages regarding one or more specified extended capabilities not directly implemented by the WebSocket protocol standard. In some embodiments, the request includes one or more configuration parameters associated with the control messages.

At 404, a control byte sequence is selected for each initialized extended capability. In some embodiments, the request received at 402 includes an identifier for each identified extended capability. For each of these identifiers, it is determined whether the associated extended capability is supported. For example, if the extended capability is supported, a control byte sequence for the extended capability is determined. In some embodiments, selecting a control byte sequence includes selecting a unique identifier that can be used by a WebSocket communication sender to identify that a control message for a specified extended capability is included in a WebSocket frame. For example, the control byte sequence may be included in a payload data portion of a WebSocket frame to identify that contents of the frame include a control message (e.g., a message specifying a rate that future WebSocket frames should be transmitted) that is to be processed in a different manner as compared to a normal WebSocket frame (e.g., containing end application level data) that does not include the control message. The control byte sequence may be specifically assigned to a specific extended capability. For example, a different control byte sequence exists for each different extended capability that is supported. In some embodiments, an extended capability may be selectively controlled using the control byte sequence. For example, a specified extended capability may be configured by sending a WebSocket frame that includes the control byte sequence and a control message. In another example, a specified extended capability may be selectively activated and deactivated at least in part by sending a WebSocket frame that includes the control byte sequence and a control message.

In some embodiments, the control byte sequence is a predetermined length. For example, all control byte sequences contain the same number of bits (e.g., 4 bytes) to enable efficient identification of a control byte sequence within a WebSocket frame. In some embodiments, determining the control byte sequence includes selecting a binary number. The control byte sequence may be at least in part randomly determined, selected from a list of possible options, sequentially selected, and/or dynamically generated.

In some embodiments, the control byte sequence is determined such that the bits of control byte sequence contain the maximum number of overlapping bits with the bits of one or more other control byte sequences. For example, if all of the different control byte sequences contain the maximum number of same overlapping bits, an efficient determination of whether a WebSocket frame includes any type of control byte sequence may be made by determining whether the WebSocket frame includes the bits of the overlapping bits. If the WebSocket frame does not include the bits of the overlapping bits (e.g., in the beginning of the payload data portion of the WebSocket frame), a determination may be made that the WebSocket frame does not include any control byte sequence from a group of possible control byte sequences without making a separate determination for each control byte sequence from the group. If the WebSocket frame does include the bits of the overlapping bits (e.g., in the beginning of the payload data portion of the WebSocket frame), additional processing may be performed to determine which control byte sequence, if any, from a group of possible control byte sequences is included in the WebSocket frame. An example of selecting bits of a control byte sequence that contain the maximum number of overlapping bits with the bits of one or more other control byte sequences includes selecting as the control byte sequence an available binary number representation that is sequentially adjacent to a binary number representation of one of the preexisting control byte sequences.

In some embodiments, the control byte sequence is selected based at least in part on a protocol and/or an encoding scheme associated with a WebSocket connection. In some embodiments, a control byte sequence is selected such that the control byte sequence is unlikely to occur in a normal communication utilizing the protocol and/or the encoding scheme because the control byte sequence violates a specification of the protocol and/or encoding scheme. For example, a communication of a WebSocket connection may be utilizing a UTF-8 encoding scheme (i.e., a variable length encoding scheme used to represent characters). In the UTF-8 specification, representing a character using 21 bits requires the bits to be encoded into 4 bytes. The 4 bytes are "11110xxx", "10xxxxxx", "10xxxxxx" and "10xxxxxx" where "x" represents a place where each bit of the 21 bits can be placed. When the first byte (i.e., "11110xxx") is received by a receiver, the receiver expects the subsequent 3 bytes to begin with "10" in a correct UTF-8 encoding. However, by selecting a 4 byte control byte sequence that begins with "11110xxx" but where subsequent bytes of the sequence do not all begin with "10", the selected control byte sequence cannot occur in a valid UTF-8 encoded WebSocket communication. By minimizing the likelihood that the control byte sequence is likely to occur in normal WebSocket communication, processing required to handle situations when non-control data sent in a WebSocket frame happens to include a control byte sequence (potentially causing the WebSocket frame to be incorrectly interpreted as including a control message) may be minimized.

At 406, the one or more determined control byte sequences are provided. In some embodiments, step 406 is included in step 306 of FIG. 3. In some embodiments, the provided control byte sequence is received in step 206 of FIG. 2. For example, a control byte sequence is provided together with a response indicating a successful upgrade of a connection to a WebSocket connection. One or more of the control byte sequences may be provided as a hexadecimal number. For example, an identifier of an extended capability that will be supported by an established WebSocket connection is provided with an associated hexadecimal control byte sequence that can be used to send a control message associated with the extended capability.

Figure 5:
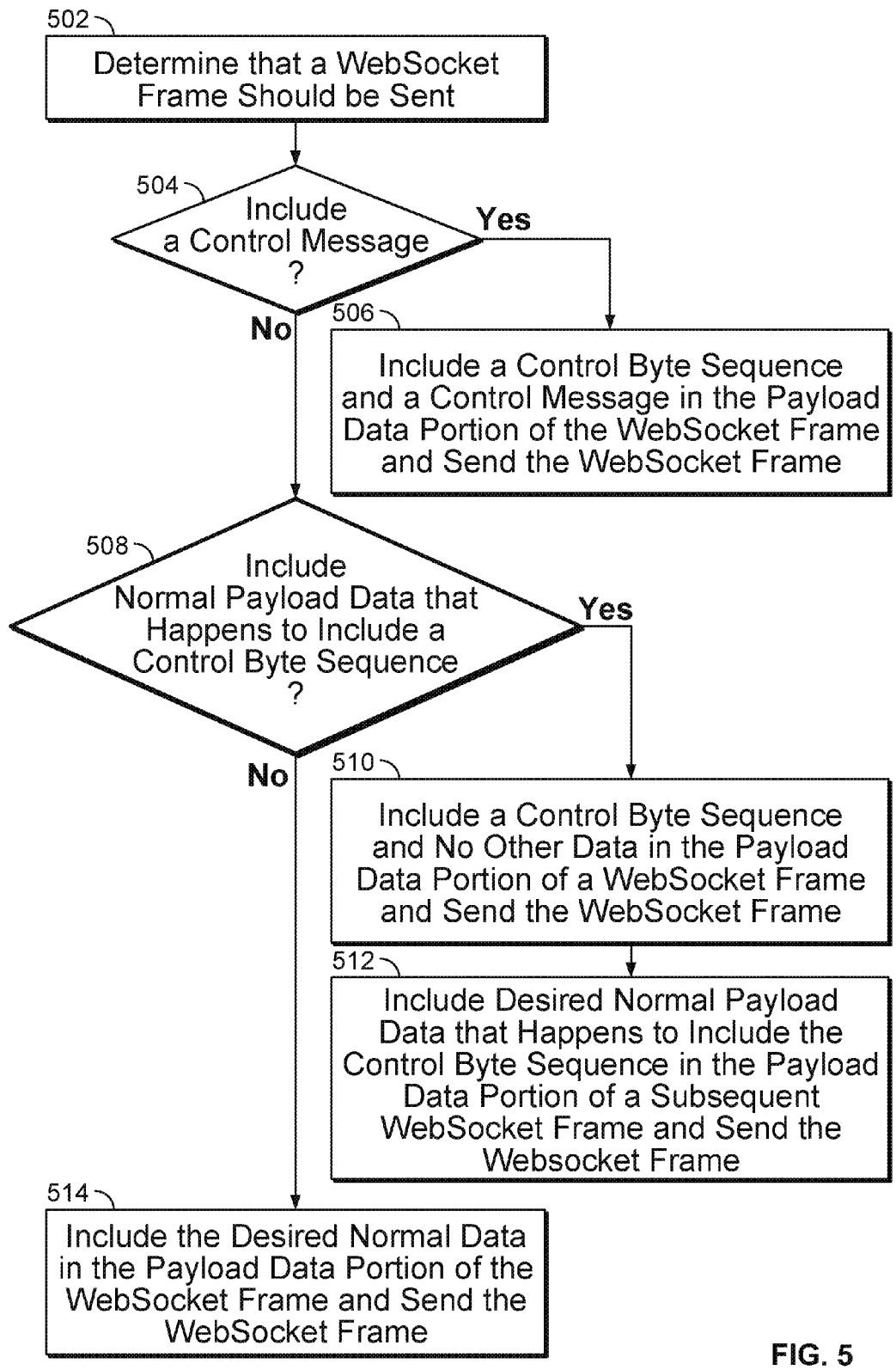
FIG. 5 is a flow chart illustrating an embodiment of a process for sending a WebSocket frame.

FIG. 5 is a flow chart illustrating an embodiment of a process for sending a WebSocket frame. The process of FIG. 5 may be implemented on client 102, server 110, server 114 and/or WebSocket gateway 112 of FIG. 1.

At 502, it is determined that a WebSocket frame should be sent. Determining that a WebSocket frame should be sent may be associated with preparing a WebSocket frame to be sent. If at 504 it is determined that the WebSocket frame to be sent should include a control message, at 506, a control byte sequence and a control message are included in the payload data portion of the WebSocket frame and the frame is sent. The frame may be included in a group of frames before being sent. The control byte sequence is associated with the extend functionality to be controlled using the control message. In some embodiments, the control byte sequence is a control byte sequence determined at step 404 of FIG. 4. The control byte sequence, if present in a WebSocket frame, may be required to be placed within the same relative position within a payload portion of a WebSocket frame. For example, a control byte sequence, if present, is always placed in the beginning of the payload data portion of a WebSocket frame. The control message may include data that specifies a configuration parameter, metadata, and/or a data to be processed by the identified extended functionality. In some embodiments, the control message is managed, created, and/or processed at a processing level above an end destination application. For example, the control message is processed by a web browser above the processing level of a web application executing within the web browser. In this example, although normal payload contents of a WebSocket frame are forwarded to the web application, the web application is unaware of control messages in the payload of a WebSocket frame.

In some embodiments, if a WebSocket frame includes a control message, the WebSocket frame is required to include one or more specific data in a metadata portion (e.g., an opcode portion) of the WebSocket frame. For example, according to the WebSocket standard, all WebSocket frames must include a 4 bit opcode that specifies how to interpret the payload portion of the WebSocket frame. In some embodiments, if a WebSocket frame includes a control message, the WebSocket frame is required to include an opcode for a "binary frame" (i.e., hex "%x2"). In this case, a receiver of a WebSocket frame may make a quick determination on whether the received WebSocket frame potentially includes a control message by analyzing the opcode of the WebSocket frame. If the WebSocket frame does not contain a specific opcode (e.g., opcode for "binary frame"), it can be quickly determined that further processing required to determine and process a control message does not need to be performed on that WebSocket frame.

If at 504 it is determined the WebSocket frame to be sent should not include a control message, at 508 it is determined whether normal payload data that happens to include a control byte sequence is being sent. In some embodiments, the normal payload data does not include a control message. For example, the normal payload data is intended for an end destination application such as web application 106 of FIG. 1. In some embodiments, although bandwidth efficiency is gained by not dedicating a fixed portion of the WebSocket frame to a control byte sequence, there exists a need to address situations when normal non-control data is being sent in the payload data portion of a WebSocket frame but the data desired to be sent happens to include a control byte sequence that might cause the WebSocket frame to be incorrectly interpreted as including a control message. If the normal payload data to be sent happens to include a control byte sequence, at 510, a WebSocket frame that only includes in its payload data portion the control byte sequence and no other data is sent. This WebSocket frame signals that the subsequent WebSocket frame that includes the control byte sequence should not be interpreted as containing a control message. Then at 512, the desired non-control data that happens to include the control byte sequence is included in the payload data portion of a subsequent WebSocket frame and the WebSocket frame is sent. This WebSocket frame would be interpreted as not including a control message.

If at 508 it is determined that normal payload data to be sent in the WebSocket frame does not happen to include a control byte sequence, at 514, the desired normal payload data is included in the payload data portion of the WebSocket frame and the WebSocket frame is sent. For example, because no special processing is necessary with respect to the interpretation of the payload data of the WebSocket frame, the Web-Socket frame may be created and sent normally as defined in the WebSocket standard. In some embodiments, the WebSocket frame may be included in a grouping of WebSocket frames before being sent.

Figure 6:
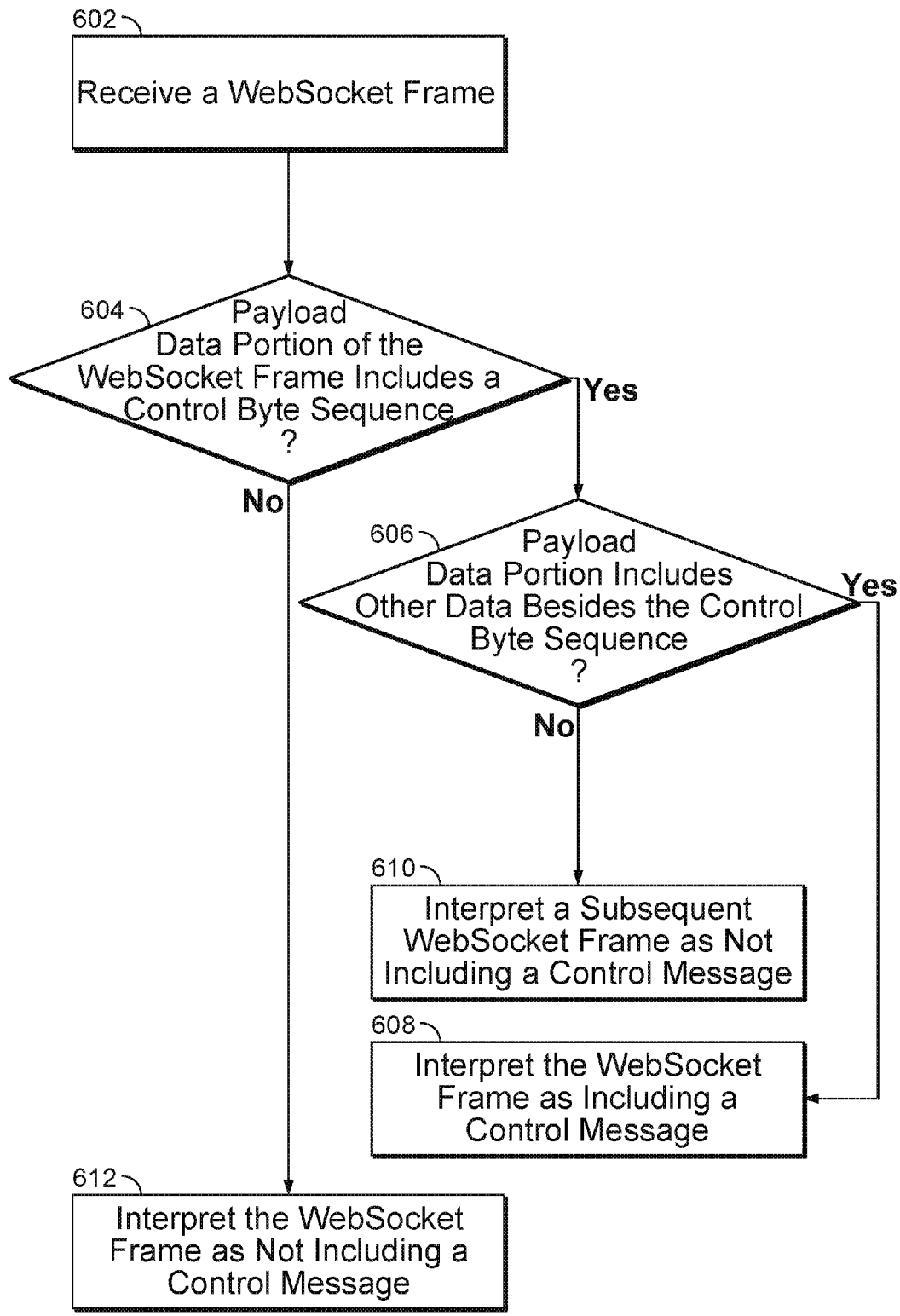
FIG. 6 is a flowchart illustrating an embodiment of a process for receiving a WebSocket frame.

FIG. 6 is a flowchart illustrating an embodiment of a process for receiving a WebSocket frame. The process of FIG. 6 may be implemented on client 102, server 110, server 114 and/or WebSocket gateway 112 of FIG. 1. At 602, a WebSocket frame is received. In some embodiments, the received frame includes the WebSocket frame sent at least in part by using the process of FIG. 5. In some embodiments, the received WebSocket frame may be one frame of a group of WebSocket frames received together.

At 604 it is determined whether the payload data portion of the received WebSocket frame includes a control byte sequence. In some embodiments, the control byte sequence is a control byte sequence determined at 404 of FIG. 4. The control byte sequence, if present in a WebSocket frame, may be required to be placed within the same relative position as a payload portion of a WebSocket frame. For example, a control byte sequence, if present, is always placed in the beginning of the payload data portion of a WebSocket frame. If at 604 it is determined that the payload data portion of the received WebSocket frame includes a control byte sequence, at 606 it is determined whether the payload data portion also includes other data besides the control byte sequence. If the payload data does include other data, at 608, the received WebSocket frame is interpreted as including a control message. In some embodiments, interpreting the WebSocket frame as including a control message includes determining which extended functionality is associated with the control byte sequence and interpreting the control message based on the determined extended functionality.

In some embodiments, interpreting the WebSocket frame as a control message includes processing the control message included in the payload data portion of the WebSocket frame. This data may specify a configuration parameter, metadata, and/or a data to be otherwise processed. In some embodiments, the control message is managed, created, and/or processed at a processing level above an end destination application. For example, the control message is managed by a web browser above the processing level of a web application executing within the web browser. In this example, although normal payload contents of a WebSocket frame are forwarded to the web application, the web application is unaware of the control messages and is provided the control message. In some embodiments, the WebSocket frame interpreted at 608 was sent in step 506 of FIG. 5.

If at 606 it is determined that the payload data portion does not include other data besides the control byte sequence, at 610 it is determined to interpret the next received WebSocket frame that includes the control byte sequence as not including a control message. For example, payload data contents of a subsequently received WebSocket frame are forwarded to a destination application such as web application 106 of FIG. 1. In some embodiments, the WebSocket frame that only includes the control byte sequence in its payload was sent in step 510 of FIG. 5 and the subsequent WebSocket frame to be interpreted as not a control message is sent in step 512 of FIG. 5.

If at 604 it is determined that the payload portion of the received WebSocket frame does not include the control byte sequence, at 612, the WebSocket frame is interpreted as not including a control message. For example, because no special processing is necessary with respect to the interpretation of the payload data of the WebSocket frame, the WebSocket frame may be processed normally as defined in the WebSocket standard. In some embodiments, payload contents of the WebSocket frame are forwarded to a destination application such as web application 106 of FIG. 1 because the WebSocket frame does not include a control byte sequence. In some embodiments, the WebSocket frame interpreted at 612 was sent in step 514 of FIG. 5.

In some embodiments, the process of FIG. 6 is only utilized to determine whether a received WebSocket frame includes a control message if the WebSocket frame includes one or more specific data in an opcode portion of the WebSocket frame. For example, according to the WebSocket standard, all WebSocket frames include a 4 bit opcode that specifies how to interpret the payload portion of the WebSocket frame. In some embodiments, if a WebSocket frame includes a control message, the WebSocket frame is required include an opcode for a "binary frame" (i.e., hex "%x2"). In this case, a receiver of the received WebSocket frame may make a quick determination on whether the received WebSocket frame potentially includes a control message by analyzing the opcode of the WebSocket frame. If the WebSocket frame does not contain a specific opcode (e.g., opcode for "binary frame"), it can be quickly determined that further processing required to determine and process a control message does not need to be performed on the WebSocket frame and, as in the case of step 612, the WebSocket frame is interpreted as not including a control message.

Figure 7:
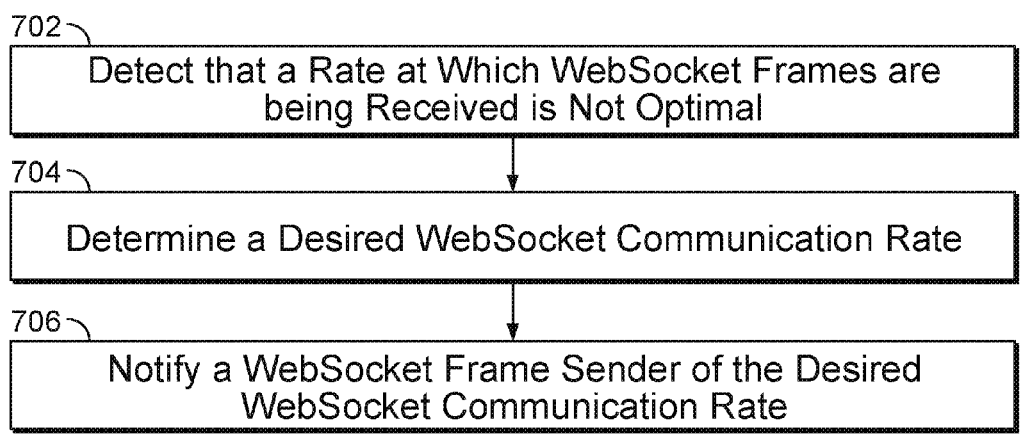
FIG. 7 is a flowchart illustrating an embodiment of a process for notifying a WebSocket frame sender of a desired WebSocket frame communication rate.

FIG. 7 is a flowchart illustrating an embodiment of a process for notifying a WebSocket frame sender of a desired WebSocket frame communication rate. The process of FIG. 7 may be implemented on client 102, server 110, server 114 and/or WebSocket gateway 112 of FIG. 1. An example of an extended functionality includes the ability to signal to a sender of a WebSocket communication a desired communication rate of the WebSocket communication. For example, because WebSocket communication utilizes a TCP connection that was designed to transmit a given amount of data as fast as possible, WebSocket communication is transmitted at the fastest supported speed. However, in some cases it is not desirable to send and receive WebSocket communication at the fastest possible speed. In various embodiments, the process of FIG. 7 is executed periodically, dynamically, and/or on a predetermined basis.

At 702, it is detected that a rate at which WebSocket frames are being received is not optimal. In some embodiments, although a system receiving the communication may be able to receive the communication at a relatively fast speed, an application utilizing the WebSocket protocol may lack resources (e.g., lack of processing resources allocated to the application) to efficiently process all of the received data in a timely manner. If data is being received by a receiving system at a rate that is faster than the optimal rate, an application utilizing the WebSocket protocol may become overwhelmed. In some embodiments, it is determined that the rate is not optimal at least in part by detecting that data is being received at a rate that is faster than the rate the data can be processed. In some embodiments, it is determined that the communication rate is not optimal (e.g., faster or slower than desired) at least in part by detecting that one or more processing resources (e.g., processing utilization, memory utilization, storage utilization, etc.) have reached a specified utilization level. In some embodiments, the rate is not optimal because data is being received by a receiving system at a rate that is slower than the optimal rate. In some embodiments, it is determined that the rate is not optimal at least in part by detecting that data is being received at a rate that is slower than the rate data can be processed. For example, a receiver has previously requested a reduction in the transmission rate and subsequently the receiver may now desire data to be transmitted at a faster rate (e.g., normal full speed due to an increase in resources of the receiver, a slighter faster rate due to a previous miscalculation of the desired rate, etc.).

In some cases, a device receiving the WebSocket communication may be a mobile or other device utilizing battery power. The life and performance of the battery may be linked to a communication rate of data that is being received and processed. For example, a processor of a device may be executed in distinct power states corresponding to amounts of computing resources required. Because transitioning between power states consumes processing and power resources, once a processor is in a high power state, it may linger in the high power state for a period of time before powering down to a lower power state. Bursts of large amounts of data at a high communication rate may keep the device at a high power state even though a constant lower transmission rate could allow the device to process the same amount of data in the same amount of time without causing the device to enter the high power state. Conversely, it may be determined that the rate is not optimal at least in part by detecting that data can be received at a faster rate without a material effect on power consumption. For example, a receiver has previously requested a reduction in the transmission rate and subsequently the receiver may now desire data to be transmitted at a faster rate (e.g., normal full speed due to a device being plugged into a new power source or a slighter faster rate due to a previous miscalculation of the desired rate, etc.).

In some embodiments, it is determined that the rate is not optimal at least in part by detecting a power state of a device. The power state may be a processor power state, a device power scheme, a type of power being utilized/available (e.g., battery or plugged-in to external power source), and/or any other state associated with a power consumption of a device. In some embodiments, it is determined that the rate is not optimal at least in part by detecting a battery state of a device. The battery state may include, for example, a battery power level, a type of a battery, and/or a charging state of a battery. In some embodiments, it is determined that the rate is not optimal at least in part by analyzing a power consumption/utilization history. The power consumption history may include historical power states of a device and/or historical battery state of a device. In some embodiments, power consumption/utilization history may include a history of a particular device and/or one or more other devices (e.g., similar devices) associated with the particular device.

In some embodiments, it may be desirable to control the rate at which WebSocket frames are being sent to control a resolution of a data being received. For example, a higher fidelity, quality, and/or sampling of data being communicated via a WebSocket connection may be desired. In some embodiments, it may be desirable to control the rate at which WebSocket frames are being sent to control the bandwidth utilization (e.g., to reduce bandwidth charges by a network provider). For example, it is determined that the rate is not optimal at least in part by detecting a type of communication link (e.g., WIFI vs. cellular connection) being utilized. In some embodiments, it is determined that the rate is not optimal at least in part by detecting the amount of allocated bandwidth consumed. For example, a user may be allocated a fixed amount of bandwidth that can be utilized within a fixed amount of time and the optimal rate may depend on the amount of bandwidth that has already been consumed within the time period.

At 704, a desired WebSocket communication rate is determined. The desired WebSocket communication rate may include a desired WebSocket frame send rate and/or a desired WebSocket frame receive rate. In some embodiments, the desired rate is determined at least in part by determining a quantity of data that has been received but not yet processed by an application. In some embodiments, the desired rate is determined at least in part by determining a data receive rate and a processing rate of an application. For example, data may be received at 25 kilobytes per second (KB/s) but an application may only be able to process the data at 15 KB/s. In this case, the desired rate may be 15 KB/s (i.e., 10 KB/s less than the current receive rate). In some embodiments, the desired rate is determined at least in part by determining the amount of data that has been already received yet not processed. For example, the desired rate is determined to be less than a processing rate of an application to allow the application to catch up on processing of backlogged data to be processed. For example, an application is able to process data at 15 KB/s but a desired rate of 14 KB/s is chosen to allow the application to catch up on processing. The desired rate may be increased when no additional received data to be processed exists or amount of received data to be processed reaches a threshold amount.

In some embodiments, in order to control the rate at which WebSocket frames are sent, a sender may reduce/improve the fidelity, quality, and/or sampling of data being communicated via a WebSocket connection. For example, a resolution of a video being transmitted may be reduced/improved. In another example, stock price quotes being transmitted are sampled at a longer/shorter interval. In some embodiments, the desired WebSocket communication rate is associated with a resolution, fidelity, quality, and/or sampling rate of a data being communicated. In some embodiments, the determined communication rate includes a byte per second rate. In some embodiments, the determined communicate rate is a relative direction change indicator. For example, the desired determined rate may simply indicate an increase or decrease in rate as compared to a current communication rate. In some embodiments, the desired rate is determined at least in part by comparing a rate WebSocket frames are being received as compared to a rate that WebSocket frames are being processed. In some embodiments, the desired rate is determined at least in part by detecting utilization indicator(s) of processing resources (e.g., measurements of processing utilization, memory utilization, storage utilization, etc.). In some embodiments, the desired rate is determined at least in part by detecting a power and/or battery state/history of a device. In some embodiments, the desired rate is determined based at least in part on a type of communication link (e.g., WIFI vs. cellular connection) being utilized. In some embodiments, the desired rate is determined based at least in part on the amount of bandwidth allocated/consumed.

At 706, a WebSocket frame sender is notified of the determined WebSocket communication rate. Previously it has been difficult to control the rate at which WebSocket frames are sent because only the receiver (i.e., not the sender) is aware of the optimal transmission/receive rate. In some embodiments, by communicating a desired adjustment in the rate at which WebSocket frames are sent, a receiver is able to control and/or possibly influence the rate at which WebSocket frames are being sent and/or received. The communication of the desired rate adjustment may be achieved using the control message discussed earlier in the specification. In some embodiments, an extended functionality to control the WebSocket communication rate is initialized at least in part by utilizing the process of FIG. 4. For example, using the process of FIG. 4, communication parties of a WebSocket communication have confirmed support of the communication rate controlling extended functionality and a control byte sequence to be used to identify that a control message associated with the extended functionality is contained in a WebSocket frame.

In some embodiments, the WebSocket frame sender is notified of the determined WebSocket communication rate at least in part by sending a control message using at least a portion of the process of FIG. 5. For example, the WebSocket frame sender is notified of the determined WebSocket communication rate at least in part by sending a WebSocket frame that includes the determined rate as part of the control message. The WebSocket frame that is sent may include in its payload data portion, a control byte sequence and the determined desired rate that may be numerical (e.g., bits per second rate, kilobytes per second rate, etc.) or a desired relative speed change direction (e.g., resume normal faster rate, rate increase, or rate decrease command).

Figure 8:
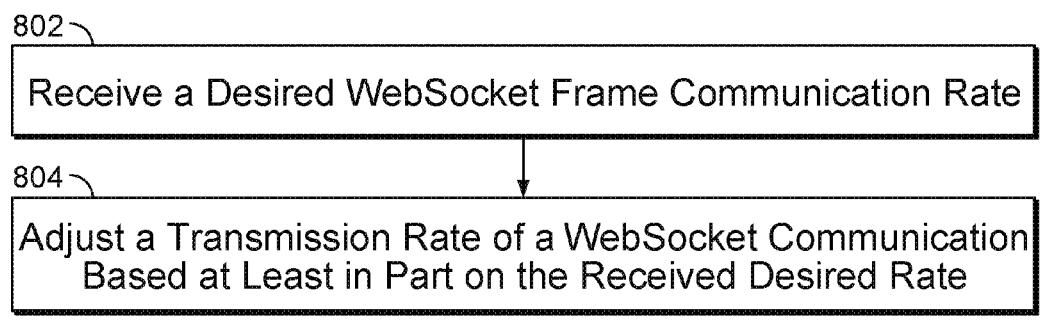
FIG. 8 is a flowchart illustrating an embodiment of a process for adjusting a transmission rate.

FIG. 8 is a flowchart illustrating an embodiment of a process for adjusting a transmission rate. The process of FIG. 8 may be implemented on client 102, server 110, server 114 and/or WebSocket gateway 112 of FIG. 1. In some embodiments, the process of FIG. 8 is included in the process of FIG. 6.

At 802, a desired WebSocket communication rate is received. In some embodiments, the received rate is the rate sent in step 706 of FIG. 7. In some embodiments, the received WebSocket communication rate is included in the received WebSocket frame in step 602 of FIG. 6 and the desired WebSocket communication rate is obtained from the WebSocket frame in step 608 of FIG. 6. In some embodiments, an acknowledgement message (e.g., in a WebSocket frame) is received for every increment of data processed by an application of the acknowledgment message sender. Based at least in part on the rate the acknowledgement messages are received, a desired WebSocket communication rate is determined. In some embodiments, information that can be used to determine the desired rate is received (e.g., in a WebSocket frame) and based at least in part on the received information, the desired WebSocket communication is determined. For example, information such as a type of device, a power state of a device, a type of power being utilized/available, a battery state of a device, a power consumption/utilization history, a type of communication link (e.g., WIFI vs. cellular connection) being utilized, and/or amount of allocated bandwidth consumed is received and a sender of the WebSocket communication determines the desired WebSocket communication rate.

At 804, a transmission rate of a WebSocket communication is adjusted based at least in part on the received desired rate. In some embodiments, step 804 is included in step 608 of FIG. 6. In some embodiments, adjusting the transmission rate includes adjusting the amount of data being sent via a WebSocket connection based at least in part on the desired rate. In some embodiments, adjusting the transmission rate includes adjusting the amount of data being sent per unit of time based at least in part on the desired rate. In some embodiments, adjusting the transmission rate includes adjusting a fidelity, quality, and/or sampling of data being communicated via a WebSocket connection. In some embodiments, the received desired rate is a relative speed direction indicator and the rate is increased/decreased by a predetermined amount and/or a dynamically determined amount in the direction specified by the indicator. In some embodiments, the received desired rate is a numerical rate and the transmission rate is adjusted as close as possible to the desired rate.

In various embodiments, it may not be efficient and/or possible to adjust the transmission rate to the exact desired rate and the transmission rate is adjusted to a different rate based at least in part on the desired rate. For example, the desired rate may not be achievable and the receiver of the desired rate adjusts the transmission rate to an achievable rate that is as close as possible to the desired rate. In some embodiments, the request to adjust the transmission rate to the provided desired rate may be ignored. For example, the desired rate may not be possible and/or known to be incorrect/undesirable and a receiver of the desired rate may ignore the request. In some embodiments, the WebSocket connection may be associated with a maximum transmission rate limit and the transmission rate can only be adjusted up to the limit even if received desired rate is higher than the limit. For example, a WebSocket server may provide different speed/bandwidth service levels based on a type of account/plan subscribed by a client. In some embodiments, a receiver of a WebSocket communication is aware of a maximum communication rate (e.g., provided by a sender during an opening handshake process, initialization/configuration of an extended functionality, or during another instance), and the receiver (or any intermediary) self-controls processing rate of the received communication to account for the maximum communication rate. In some embodiments, the receiver of a WebSocket communication is aware of a maximum allotted communication rate limit and receiver requests changes to the WebSocket communication rate within the limit Although the examples above discuss upgrading an existing HTTP/HTTPS to a WebSocket connection, in some embodiments, another type of connection such as a stream of a SPDY protocol connection is requested to be upgraded to a WebSocket connection. In various embodiments, other protocol such as SPDY may be utilized on top of an established WebSocket connection.

Although the examples above discuss upgrading an existing HTTP/HTTPS connection to a WebSocket connection, in some embodiments, a protocol other than the WebSocket protocol may be used. For example, another protocol that changes a HTTP/HTTPS connection to a bi-directional, full-duplex communication channel may be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for receiving a WebSocket frame, comprising:
a communication interface configured to receive the WebSocket frame; and
a processor configured to:
   determine whether the WebSocket frame includes a control byte sequence in a payload data portion of the WebSocket frame, wherein determining whether the WebSocket frame includes the control byte sequence includes analyzing an opcode included in the WebSocket frame;
   in the event the WebSocket frame includes in the payload data portion, the control byte sequence and other data, interpret the WebSocket frame as including a control message, wherein in the event the control byte sequence is included in the payload data portion, the control byte sequence is required to be in a beginning of the payload data portion;

in the event the WebSocket frame does not include in the payload data portion, the control byte sequence, interpret the WebSocket frame as not including the control message; and in the event the WebSocket frame includes in the payload data portion, a specification that a subsequently received WebSocket frame is to be not interpreted as including the control message, interpret the subsequently received WebSocket frame as not including the control message even if the subsequently received WebSocket frame includes the control byte sequence and other data in the payload data portion of the subsequently received WebSocket frame.

2. The system of claim 1, wherein the specification that the subsequently received WebSocket frame is to be not interpreted as including the control message is specified by including in the payload data portion, the control byte sequence but no other data.

3. The system of claim 1, wherein the control message is associated with an extended WebSocket communication functionality not directly implemented by a WebSocket protocol.

4. The system of claim 3, wherein the control byte sequence is a unique identifier of the extended WebSocket communication functionality.

5. The system of claim 1, wherein the control byte sequence is one of a plurality of control byte sequences that are each associated with a different WebSocket communication functionality.

6. The system of claim 5, wherein the control byte sequence was selected to contain a maximum number of overlapping bits with other control byte sequences in the plurality of control byte sequences.

7. The system of claim 1, wherein the control byte sequence was at least in part randomly determined.

8. The system of claim 1, wherein the control byte sequence was at least in part sequentially selected.

9. The system of claim 1, wherein the control byte sequence was at least in part dynamically generated.

10. The system of claim 1, wherein interpreting the WebSocket frame as including the control message includes determining which extended WebSocket protocol functionality is associated with the control message at least in part by using the control byte sequence.

11. The system of claim 1, wherein interpreting the WebSocket frame as including the control message includes interpreting the control message based on an extended functionality referenced by the control byte sequence.

12. The system of claim 1, wherein the control message includes a configuration parameter.

13. The system of claim 1, wherein interpreting the WebSocket frame as including the control message includes not forwarding data in the payload data portion to an end destination application.

14. The system of claim 1, wherein interpreting the WebSocket frame as not including the control message includes forwarding data included in the payload data portion to an end destination application.

15. The system of claim 1, wherein an ability to utilize the control message was initialized during a handshake process to establish a WebSocket connection of the WebSocket frame.

16. The system of claim 1, wherein an ability to utilize the control message was initialized after a WebSocket connection of the WebSocket frame had been established.

17. The system of claim 1, wherein the control byte sequence was at least in part determined based on an encoding scheme associated with a WebSocket connection of the WebSocket frame.

18. The system of claim 1, wherein the control byte sequence was at least in part determined based on a protocol associated with a WebSocket connection of the WebSocket frame.

19. The system of claim 1, wherein determining whether the WebSocket frame includes the control byte sequence includes analyzing a header portion of the WebSocket frame.

20. The system of claim 1, wherein the system is not configured to send a WebSocket frame with the control message.

21. A system for sending a WebSocket frame, comprising:
a processor configured to:
determine that the WebSocket frame should be sent;
determine whether to send a control message in the WebSocket frame;
in the event it is determined that the control message should be sent, insert a control byte sequence and a control message in a payload data portion of the WebSocket frame, wherein in the event the control byte sequence is included in the payload data portion, the control byte sequence is required to be in a beginning of the payload data portion; and
in the event it is determined that the control message should not be sent, not insert the control byte sequence in the WebSocket frame; and
in the event it is determined that the control message should not be sent but a data to be sent happens to include the control byte sequence, insert in the payload data portion of the WebSocket frame a specification that a subsequently received WebSocket frame is to be not interpreted as including the control message even if the subsequently received WebSocket frame includes the control byte sequence and other data in the payload data portion of the subsequently received WebSocket frame; and
a communication interface configured to send the WebSocket frame.

22. The system of claim 21, wherein the specification that the subsequently received WebSocket frame is to be not interpreted as including the control message is specified by including in the payload data portion, the control byte sequence but no other data.

23. A method for receiving a WebSocket frame, comprising:
receiving the WebSocket frame;
using a processor to determine whether the WebSocket frame includes a control byte sequence in a payload data portion of the WebSocket frame, wherein to determine whether the WebSocket frame includes the control bye sequence includes analyzing an opcode included in the WebSocket frame;
in the event the WebSocket frame includes in the payload data portion, the control byte sequence and other data, interpreting the WebSocket frame as including a control message,
wherein in the event the control byte sequence is included in the payload data portion, the control byte sequence is required to be in a beginning of the payload data portion; and
in the event the WebSocket frame does not include in the payload data portion, the control byte sequence, interpreting the WebSocket frame as not including the control message; and in the event the WebSocket frame includes in the payload data portion, a specification that a subsequently received WebSocket frame is to be not interpreted as including the control message, interpret the subsequently received WebSocket frame as not including the control message even if the subsequently received WebSocket frame includes the control byte sequence and other data in the payload data portion of the subsequently received WebSocket frame.

24. The method of claim 23, wherein the specification that the subsequently received WebSocket frame is to be not interpreted as including the control message is specified by including in the payload data portion, the control byte sequence but no other data.

25. A computer program product for receiving a WebSocket frame, the computer program product being embodied in a non-transitory computer readable storage medium and comprising computer instructions for:

receiving the WebSocket frame;

determining whether the WebSocket frame includes a control byte sequence in a payload data portion of the WebSocket frame, wherein determining whether the WebSocket frame includes the control byte sequence includes analyzing an opcode included in the WebSocket frame;

in the event the WebSocket frame includes in the payload data portion, the control byte sequence and other data, interpreting the WebSocket frame as including a control message, wherein in the event the control byte sequence is included in the payload data portion, the control byte sequence is required to be in a beginning of the payload data portion; and in the event the WebSocket frame does not include in the payload data portion, the control byte sequence, interpreting the WebSocket frame as not including the control message; and in the event the WebSocket frame includes in the payload data portion, a specification that a subsequently received WebSocket frame is to be not interpreted as including the control message, interpret the subsequently received WebSocket frame as not including the control message even if the subsequently received WebSocket frame includes the control byte sequence and other data in the payload data portion of the subsequently received WebSocket frame.

* * * * *